United States Patent
Weaver

(10) Patent No.: US 6,820,291 B1
(45) Date of Patent: Nov. 23, 2004

(54) FAUCET ASSEMBLY WITH EASY-INSTALL PRE-RINSE UNIT MECHANISM

(75) Inventor: Mark Weaver, Six Mile, SC (US)

(73) Assignee: T&S Brass and Bronze Works, Inc., Travelers Rest, SC (US)

( * ) Notice: Subject to any disclaimer, the term of this patent is extended or adjusted under 35 U.S.C. 154(b) by 7 days.

(21) Appl. No.: 10/464,007

(22) Filed: Jun. 18, 2003

(51) Int. Cl.$^7$ .............................................. E03C 1/042
(52) U.S. Cl. .............................. 4/695; 4/675; 239/588; 285/12; 285/38; 285/354
(58) Field of Search ............................ 4/675–678, 695, 4/696; 239/280, 288, 588, 600; 285/12, 38, 64, 151.1, 330, 354

(56) References Cited

U.S. PATENT DOCUMENTS

| | | | |
|---|---|---|---|
| 2,971,520 A | | 2/1961 | Motis et al. |
| 4,456,287 A | * | 6/1984 | Bisonaya ..................... 285/354 |
| 5,364,135 A | * | 11/1994 | Anderson .................... 285/38 |
| 5,375,887 A | * | 12/1994 | Johnson ....................... 285/12 |
| 5,624,074 A | | 4/1997 | Parisi |

* cited by examiner

Primary Examiner—Tuan Nguyen
(74) Attorney, Agent, or Firm—Dority & Manning, P.A.

(57) ABSTRACT

A faucet assembly with a vertical riser that is easier to install both for an initial installation and a retrofit installation. The faucet assembly has a main faucet body that defines an axially extending cavity. A positive locking mechanism in the form of a resiliently compressible star lock washer is disposed to rest on the bottom of the cavity, which is provided with an opening that communicates with a pressurized water service. A hollow adapter sleeve is inserted into the cavity on top of the star lock washer. An O-ring between the exterior of the adapter sleeve and the surrounding sidewall that defines the cavity effects a water-tight fit between the adapter sleeve and the sidewall. The tapered threaded end of the riser is detachably connected to the adapter sleeve by being screwed into the tapered threaded opening of the adapter sleeve. A retaining nut that is slidably mounted over the riser is screwed onto the main faucet body to confine the adapter sleeve in the cavity and prevent axial movement of the adapter sleeve out of the cavity. The tightening of the retaining nut to the main faucet body applies pressure to the adapter sleeve that compresses the star lock washer, which prevents rotation of the main faucet body relative to the adapter sleeve and the riser.

14 Claims, 5 Drawing Sheets

FAUCET ASSEMBLY WITH EASY-INSTALL PRE-RINSE UNIT MECHANISM

CROSS-REFERENCE TO RELATED APPLICATIONS

N/A

STATEMENT REGARDING FEDERALLY SPONSORED RESEARCH OR DEVELOPMENT

N/A

BACKGROUND OF THE INVENTION

Water faucets that employ a vertical riser are common fixtures in commercial kitchens, especially as part of a pre-rinse unit of a dishwasher line. U.S. Pat. Nos. 2,971,520 and 5,624,074 describe a couple of examples. A common type of vertical riser has a tapered male thread that can be screwed into a tapered female thread formed in the main body of the faucet. Installing the riser into these faucet bodies, whether a new installation or a retrofit installation, involves rotation of the riser itself about its vertical axis so that the male threaded end becomes screwed into the female threaded opening in the faucet body that is fixed to the sink. As the entire riser (and whatever hardware that is attached to it) needs to be rotated, this installation can take considerable time and labor. Moreover, the extent of the bend in the upper portion of the riser requires clearance between the riser and the wall next to the sink in order to effect the rotation in a retrofit environment. Else the faucet body must be removed from the sink to screw the riser into the faucet body, a task that entails further time and labor.

OBJECTS AND SUMMARY OF THE INVENTION

It is a principal object of the present invention to provide a faucet assembly with a vertical riser that is easier to install both for an initial installation and a retrofit installation.

It is another principal object of the present invention to provide a faucet assembly with a vertical riser that includes a positive locking mechanism to prevent rotation of the riser after installation rather than relying on an interference between flat components to prevent rotation of the riser after installation.

It is a still further principal object of the present invention to provide a faucet assembly with a vertical riser that includes a positive locking mechanism that can be selectively engaged and disengaged to permit selective orientation of the riser relative to the rest of the faucet assembly, both during and after installation.

Additional objects and advantages of the invention will be set forth in part in the description that follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a faucet assembly is provided with a vertical riser that is easier to install both for an initial installation and a retrofit installation. The faucet assembly has a main faucet body that includes a sidewall defining an axially extending cavity having a bottom that is provided with an opening that communicates with a pressurized water service. A positive locking mechanism is disposed to rest on the bottom of the cavity. A resiliently compressible star lock washer provides one embodiment of a suitable positive locking mechanism. An hollow adapter sleeve is inserted into the cavity on top of the star lock washer and has a tapered threaded axially extending portion in the hollow interior. A sealing member is configured and disposed to provide a water-tight fit between the adapter sleeve and the main faucet body. In one embodiment, the sealing member can take the form of an O-ring that is disposed between the exterior of the adapter sleeve and the surrounding sidewall that defines the cavity to effect a water-tight fit between the adapter sleeve and the sidewall of the main faucet body. A tapered threaded end of the riser is detachably connected to the adapter sleeve by being screwed into the tapered threaded portion of the interior of the adapter sleeve. A retaining nut that is slidably mounted over the riser is screwed onto the main faucet body to confine the adapter sleeve in the cavity and prevent axial movement of the adapter sleeve out of the cavity. The tightening of the retaining nut to the main faucet body applies pressure to the star lock washer via the adapter sleeve. This pressure compresses the star lock washer, which prevents rotation of the main faucet body relative to the adapter sleeve and the riser.

The accompanying drawings, which are incorporated in and constitute a part of this specification, illustrate at least one presently preferred embodiment of the invention as well as some alternative embodiments. These drawings, together with the description, serve to explain the principles of the invention but by no means are intended to be exhaustive of all of the possible manifestations of the invention.

DETAILED DESCRIPTION OF THE PREFERRED EMBODIMENTS

Reference now will be made in detail to the presently preferred embodiments of the invention, one or more examples of which are illustrated in the accompanying drawings. Each example is provided by way of explanation of the invention, which is not restricted to the specifics of the examples. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. The same numerals are assigned to the same components throughout the drawings and description.

Figure 1:
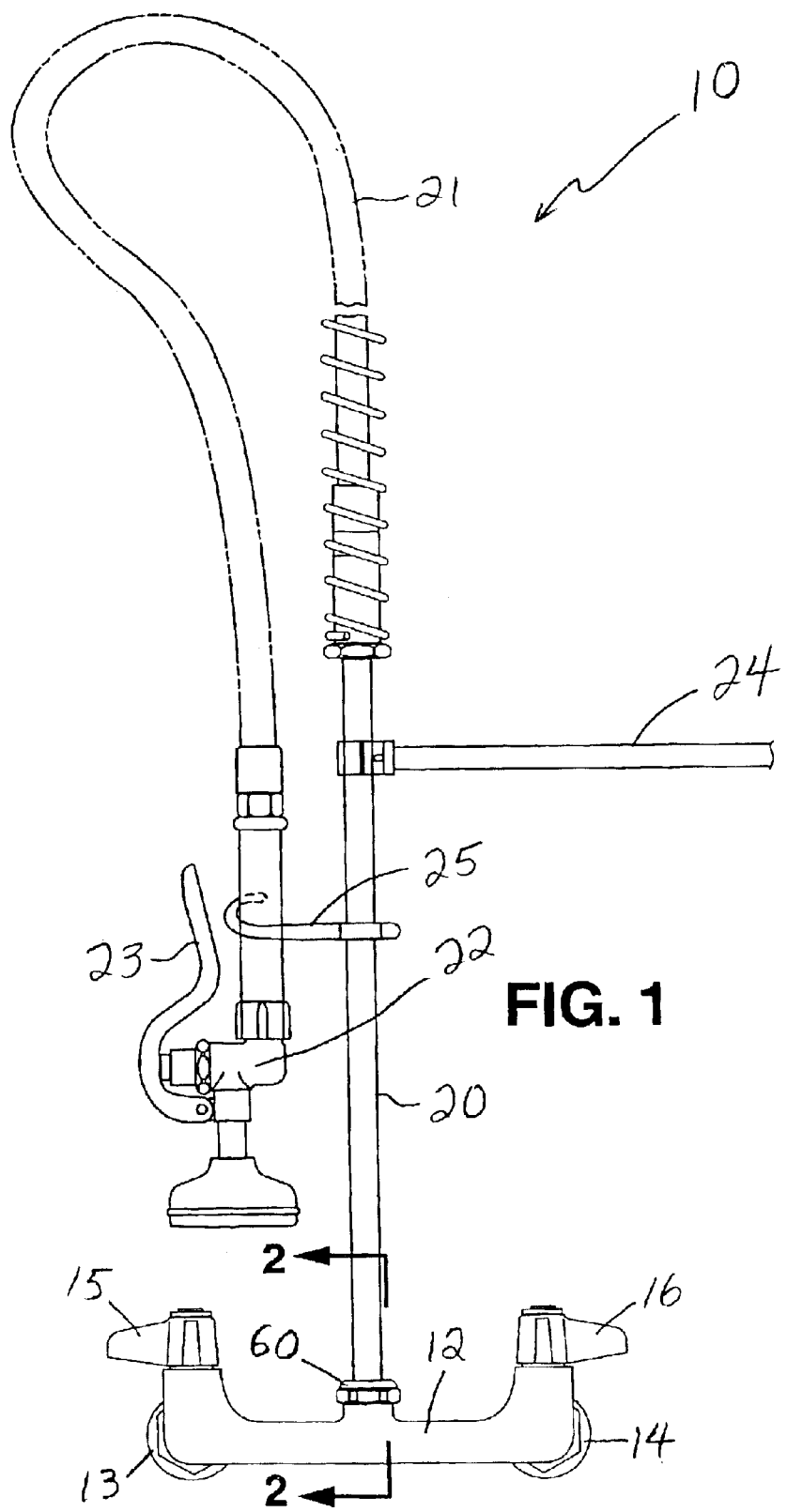
FIG. 1 is a side plan view of a presently preferred embodiment of the present invention.

A presently preferred embodiment of the faucet assembly of the present invention is shown in FIG. 1 and is represented generally by the numeral 10. As shown in FIG. 1, the faucet assembly 10 is configured for regulating the flow of water from a pressurized water service such as is found in any modern city wherein fresh water is supplied from a reservoir through pipes into the city to provide a pressurized water service. The faucet assembly includes a main faucet body 12 that is configured to be connected in communication with a pressurized water service. As shown in FIG. 1 for example, a pair of wall fixtures 13, 14 connects the main faucet body 12 to the pressurized water service (not shown) of the building in which the faucet assembly 10 is installed. A flow of hot water is regulated through the faucet body 12 by a valve (not shown) having a manual control that can be activated by a handle 15. Similarly, a flow of cold water is regulated through the faucet body 12 by another valve (not shown) having a manual control that can be activated by a handle 16. As shown in FIGS. 2A, 2B, 2C and 3 for example, the main faucet body can include an internal passage wall 17 that defines an internal passage 18. It is this internal passage that eventually is connected in communication with the pressurized water service via the fixtures 13, 14 in the wall.

As shown in FIG. 1 for example, the faucet assembly includes a riser 20. One end of the riser 20 is detachably connected to the main faucet body 12 and extends vertically therefrom. The opposite end of the riser can be detachably connected to one end of a flexible hose 21. The opposite end of the flexible hose 21 can be connected in communication with a spray nozzle valve 22 that has a lever 23 for manual operation to open and close the valve 22. The assembly 10 also can include a rigid support such as a wall bracket 24 having one end connected to the riser 20 and an opposite end (not shown) configured to be attached to a nearby structure. As shown in FIG. 1 for example, the wall bracket 24 is fixed to a wall (not shown) near the main faucet body 12. The manner of fixation can be any known mechanical means such as screws, nails, glue, bolts and the like. Additionally, a retention hook 25 can have one end connected by mechanical means to the riser 20 and be configured with an opposite end that can be used to retain the spray valve nozzle 22 at a convenient location near the riser 20 when the spray valve nozzle 22 is not in use by the operator. As shown in FIG. 1 for example, the grasping end of the retention hook 25 is configured as a semi-circular arcuate member.

In addition to the main faucet body 12, the faucet assembly 10 desirably includes an adaptor sleeve 40 and a resiliently compressible, positive locking mechanism that prevents relative rotation between the adaptor sleeve and the main faucet body. The main faucet body defines a cavity that receives the adapter sleeve 40. The positive locking mechanism can be provided by a star lock washer 30 that is disposed in the bottom of the cavity of the main faucet body 12, and the bottom of the adapter sleeve 40 rests against the star lock washer 30. Desirably, the exterior of one end of the adapter sleeve 40 retains a sealing member that is configured and disposed to provide a water-tight seal between the adapter sleeve 40 and the surrounding wall of the cavity of the main faucet body 12.

The riser 20 is detachably connected to the adapter sleeve 40. A retaining nut 60 slides over the riser 20 and is detachably connected to the main faucet body 12 to retain the adapter sleeve 40 in place in the cavity of the main faucet body. An example of these components now will be described more particularly in accordance with the configuration that is presently deemed desirable in the present invention.

Figure 3:
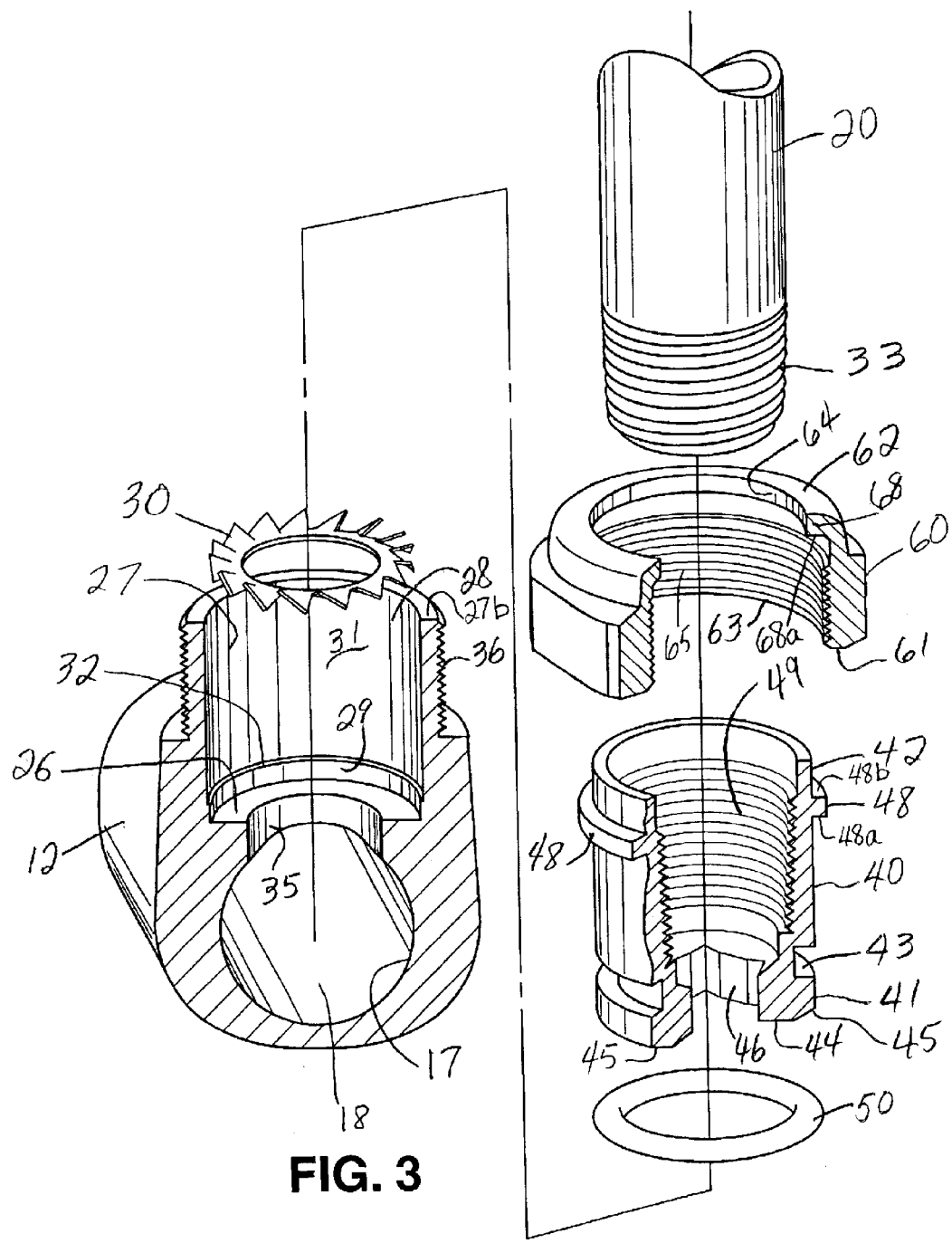
FIG. 3 is an elevated perspective assembly view of the components shown in FIG. 2A with portions cut away in some components and portions shown in cross-section in some components.

As embodied herein and shown in FIG. 3 for example, the main faucet body 12 includes a base 26 and a sidewall 27 disposed orthogonally with respect to the base 26. The sidewall 27 extends axially from the base 26 to define an opening 28 opposite the base 26. The sidewall 27 defines an axially extending interior surface. As shown in FIG. 3 for example, the interior surface of the sidewall 27 is generally cylindrical throughout and defines a throat portion 29 at one end and a mouth portion 31 opposite to the throat portion 29.

Figure 2A:
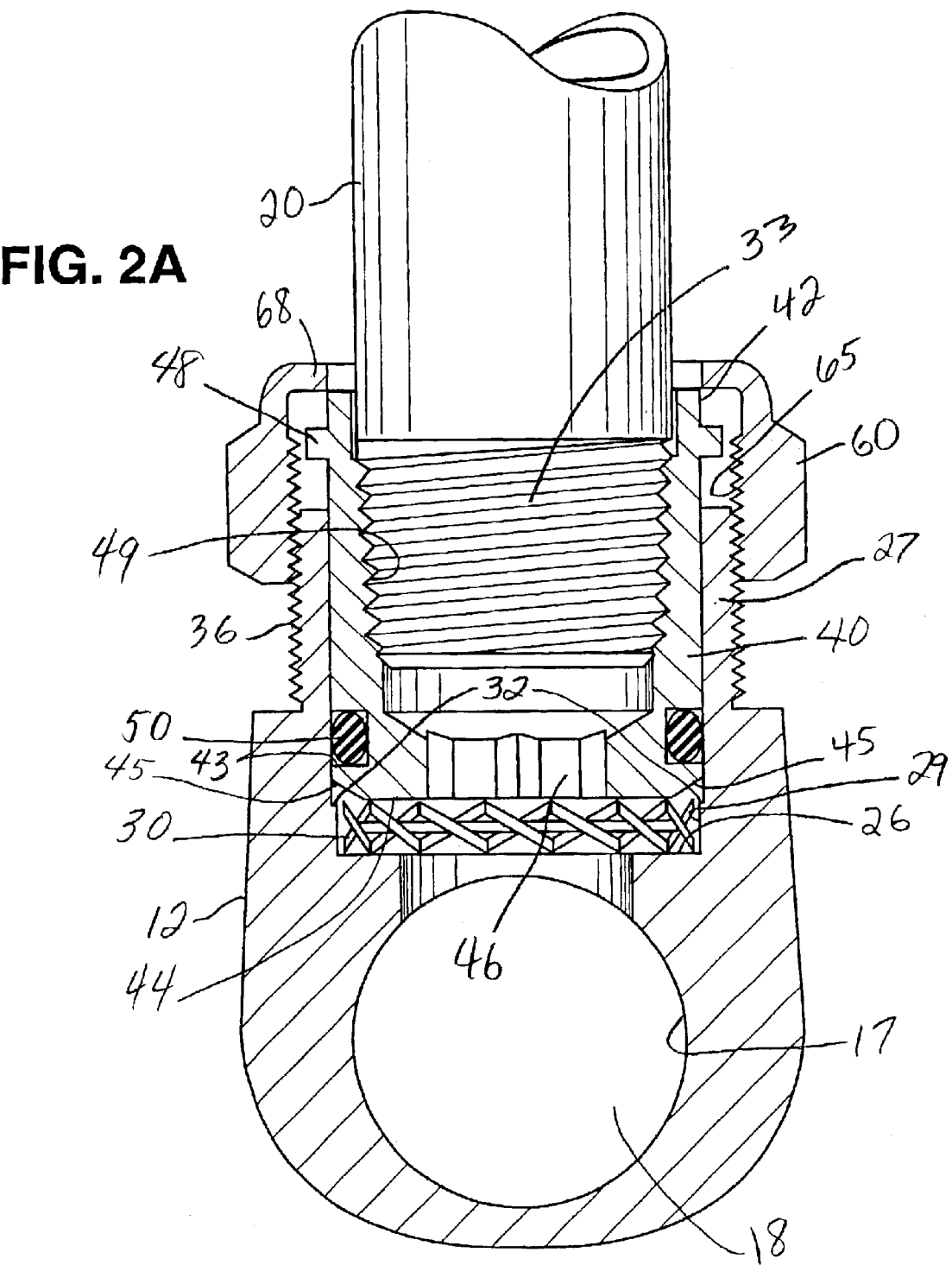
FIG. 2A is a partial cross-sectional view looking in the direction of the arrows designated 2—2 in FIG. 1 with portions cut away in some components and portions shown in cross-section in some components.
Figure 2B:
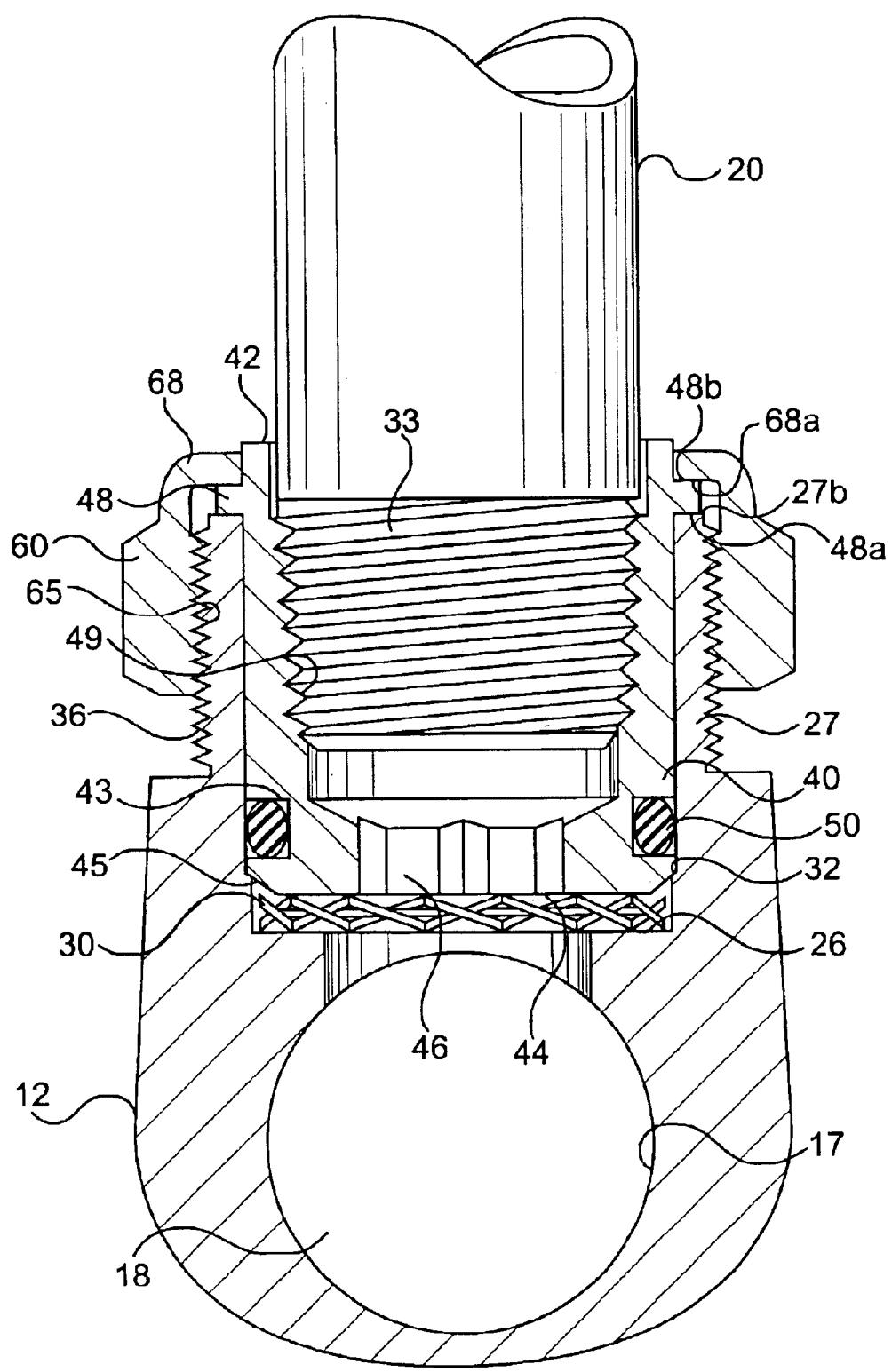
FIG. 2B is a partial cross-sectional view of a presently preferred embodiment taken from the same direction as in FIG. 2A but at a different stage of the assembly of the riser to the main faucet body.

As shown in FIGS. 2A, 2B, 2C and 3 for example, the interior surface of the sidewall 27 defines an annular ledge 32 that extends in a plane that is generally parallel to the base 26. As shown in FIG. 3 for example, one end of the ledge 32 is connected to the upper edge of the throat portion 29 of the interior surface of the sidewall 27. The opposite end of the ledge 32 defines an edge that is connected to the lower section of the mouth portion 31 of the interior surface of the sidewall 27. Though ledge 32 is shown in the embodiment of FIG. 2B, the ledge 32 can be eliminated from this embodiment if desired.

As shown in FIG. 3 for example, the interior surface of the sidewall 27 and the base 26 combine to define the side and bottom, respectively, of an axially extending cavity that is defined in the main faucet body 12. This cavity is configured to receive the adaptor sleeve 40. The sidewall 27 of main faucet body 12 also defines a free edge surface 27b that resides in an annular plane that is parallel to the annular plane defining the base 26.

As shown in FIGS. 2A, 2B, 2C and 3 for example, the main faucet body 12 includes an internal passage wall 17 that defines an internal passage 18. As shown in FIG. 3 for example, the main faucet body 12 defines a conduit wall 35 that defines a conduit that connects the internal passage 18 to the cavity. As shown in FIG. 3 for example, the base 26 is connected between the throat portion 29 of the interior surface of the sidewall 27 and the conduit wall 35. As shown in FIGS. 2A, 2B, 2C and 3 for example, the sidewall 27 of the main faucet body 12 defines an exterior surface that is configured with a threaded portion 36 that is defined axially along the exterior surface.

Figure 2C:
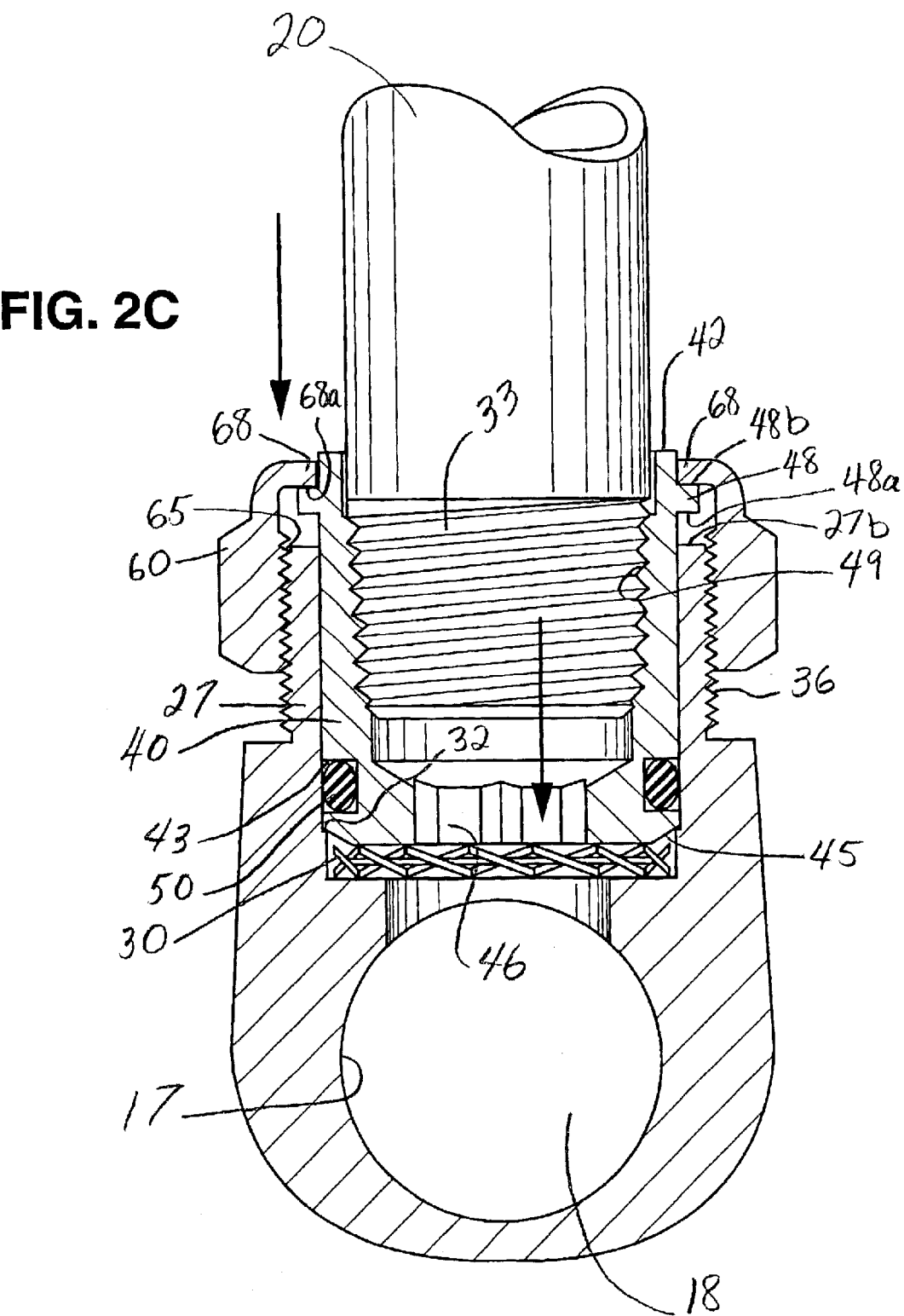
FIG. 2C is a partial cross-sectional view of an alternative embodiment looking in the same direction as in FIG. 2A but at a different stage of the assembly of the riser to the main faucet body.

In accordance with the present invention, a resiliently compressible, positive locking mechanism can be disposed in the cavity of the main faucet body and rests on the base of the cavity. As shown in FIGS. 2A, 2B and 2C for example, the resiliently compressible, positive locking mechanism can be provided by a lock washer 30 that is disposed in the cavity that is defined in the main faucet body 12. The lock washer 30 rests on the base 26 of the cavity in the main faucet body 12. As shown in FIG. 2A for example, the star lock washer 30 is configured so that it is biased with a predetermined thickness as measured in the axial direction. As shown in FIGS. 2B and 2C for example, the star lock washer 30 can be compressed so as to diminish the thickness of the star lock washer 30 as measured in the axial direction. Thus, the star lock washer 30 is resiliently compressible in the axial direction. Moreover, when the star lock washer 30 becomes compressed, the pressures act so as to prevent rotation of the star lock washer with respect to the base 26 of the main faucet body 12 and the adapter sleeve 40.

As embodied herein and shown in FIGS. 2A, 2B, 2C and 3 for example, the faucet assembly includes an adapter sleeve 40. As shown in FIG. 3, the adapter sleeve 40 has a first end 41 and a second end 42 opposed to the first end 41. As shown in FIGS. 2A, 2B, 2C and 3 for example, the adapter sleeve 40 has an axially extending length that extends between the two ends 41, 42. As shown in FIGS. 2A, 2B, 2C and 3 for example, the first end 41 of the adapter sleeve 40 defines a seat portion 44. As shown in FIGS. 2A, 2B, 2C and 3 for example, the adapter sleeve 40 is configured to be received and disposed in the cavity of the main faucet body 12, and the seat portion 44 is configured to rest against the star lock washer 30. As shown in FIGS. 2A, 2B, 2C and 3 for example, the adapter sleeve 40 has a groove 43 that is defined in the exterior near the first end 41 of the adapter sleeve 40. The groove 43 extends circumferentially around the exterior of the adapter sleeve 40 and is configured to receive an O-ring 50.

As shown in FIGS. 2A, 2B, 2C and 3 for example, a flow channel 46 is defined through the seat portion 44 to permit fluid flow therethrough. As shown in FIG. 3 for example, the exterior of the adapter sleeve 40 is surrounded by a forward edge 45 that is disposed between the seat portion 44 and the groove 43 at the first end 41 of the adapter sleeve 40. As shown in FIGS. 2A and 2C for example, the forward edge 45 of the adapter sleeve 40 is aligned generally with the ledge 32 that is formed in the interior surface of the sidewall 27 of the main faucet body 12. In the alternative embodiment of FIG. 2C, the ledge 32 prevents the approach of the seat portion 44 of the adapter sleeve 40 closer than a certain predetermined distance to the base 26 of the main faucet body 12. This distance depends on the distance between the forward edge 45 and the seat portion 44 as well as the axial length of the throat portion 29 of the interior surface of the sidewall 27 of the main faucet body 12 that exists between the ledge 12 and the base 26 of the main faucet body 12.

As shown in FIGS. 2A, 2B, 2C and 3 for example, the adapter sleeve 40 includes a retaining flange 48 that projects radially from the exterior of the adapter sleeve 40 near the second end 42 of the adapter sleeve 40. As shown in FIGS. 2A, 2B, 2C and 3 for example, the interior wall of the adapter sleeve 40 defines a tapered threaded portion 49 that is disposed between the second end 42 of the adapter sleeve and the seat portion 44 of the adapter sleeve. As shown in FIG. 3 for example, the diameter of the channel that runs axially through the adapter sleeve 40 and that is defined by the tapered threaded portion 49, decreases as one proceeds from the second end 42 of the adapter sleeve 40 to the first end 41 of the adapter sleeve 40 where the flow channel 46 is defined through the seat portion 44.

As shown in FIGS. 2A, 2B, 2C and 3 for example, an O-ring 50 is disposed in the groove 43 that is formed in the exterior of the adapter sleeve 40. The O-ring 50 desirably is comprised of a deformable resilient material such as rubber, nylon, and the like. As shown in FIGS. 2A, 2B and 2C for example, the O-ring 50 engages the interior surface of the sidewall 27 of the main faucet body 12. In so doing, the ring 50 forms a sealing member that is configured and disposed to provide a water-tight seal between the exterior of the adapter sleeve 40 and the interior surface of the sidewall 27 of the main faucet body 12.

As shown in a truncated view in FIGS. 2A, 2B, 2C and 3 for example, the riser 20 defines an axially extending hollow rigid tube. The riser 20 has opposed ends. The tube defines an exterior surface. At one end of the tube, the exterior surface of the riser 20 defines a tapered threaded portion 33 that is configured to mate with the tapered threaded portion 49 of the adapter sleeve 40. The diameter of the tapered threaded portion 33 of the end of the riser 20 increases as one moves away from the free end of the riser 20. As shown in FIGS. 2A, 2B and 2C for example, the tapered threaded portion 33 of the riser 20 is screwed into the tapered threaded portion 49 of the adapter sleeve 40. Accordingly, the riser 20 is detachably connected to the adapter sleeve 40.

As embodied herein and shown in FIGS. 2A, 2B, 2C and 3 for example, a retaining nut 60 defines an axially extending hollow nut. As shown in FIG. 3 for example, the retaining nut 60 has a first end 61 that defines a first opening 63. The retaining nut 60 has a second end 62 that defines a second opening 64. The first opening 63 is configured to allow the retaining nut 60 to be screwed onto the threaded exterior surface 36 of the sidewall 27 of the main faucet body 12. The second opening 64 is configured and sized to allow passage of the riser 20 and the second end of the adaptor sleeve, but not passage of the retaining flange 48 of the adaptor sleeve 40. Adjacent the first opening 63, the retaining nut 60 defines an axially extending interior surface that has a threaded portion 65 defined thereon. The threaded portion 65 is configured to mate with the threaded portion 36 of the exterior surface of the sidewall 27 of the main faucet body 12. As shown in FIGS. 2A, 2B and 2C for example, the threaded portion 36 of the exterior of the sidewall 27 of the main faucet body 12 is screwed into the threaded portion 65 of the retaining nut 60.

As shown in FIGS. 2A, 2B, 2C and 3 for example, the retaining nut 65 defines a shoulder portion 68. The shoulder portion 68 of the retaining nut 60 extends radially from the axially extending interior surface of the retaining nut 60 to define the second opening 64. As shown in FIGS. 2A, 2B and 2C for example, as the retaining nut 60 is screwed onto the sidewall 27 of the main faucet body 12, the shoulder portion 68 of the retaining nut 60 engages the retaining flange 48 of the exterior of the sidewall of the adapter sleeve 40. In so doing, further tightening rotation of the nut 60 forces axial movement of the seat 44 of the adaptor sleeve 40 toward the base 26 of the cavity in the main faucet body 12. This axial movement eventually causes the seat 44 to compress the washer 30 against the base 26 of the cavity defined in the main faucet body 12.

When the star lock washer 30 is sufficiently compressed between the seat portion 44 of the adapter sleeve 40 and the base 26 of the cavity defined in the main faucet body 12, the star lock washer 30 functions as a locking mechanism that prevents relative rotation between the adapter sleeve 40 and the main faucet body 12. Thus, the compression of the star washer 30 functions to prevent relative rotation between the adapter sleeve 50 and the main faucet body 12. Since the riser 20 is fixed to the adapter sleeve 40 by being screwed into the adapter sleeve 40, the riser 20 is also prevented from rotating relative to the main faucet body 12 once the retaining nut 60 is screwed onto the sidewall 27 of the main faucet body 12. Accordingly, the relative orientation of the spray nozzle valve 22 can be selected by the installer in a relatively simple fashion. Moreover, the present invention eliminates the need for the installer to completely rotate the riser 20 round and round relative to the main faucet body 12 when installing the riser 20 of the faucet assembly 10.

Each of FIGS. 2B and 2C shows a different embodiment in its locked mode wherein the locking nut is sufficiently tightened so that the compression of the star washer 30 functions to prevent relative rotation between the adapter sleeve 40 and the main faucet body 12. As shown in FIG. 2B, which depicts the embodiment that is presently preferred, when the underside surface 68a of the shoulder portion 68 of retaining nut 60 contacts the upperside surface 48b of retaining flange 48 of adaptor sleeve 40, further tightening rotation of the nut 60 forces axial movement of the adaptor sleeve 40 so as to compress the washer 30 against the base 26 of the cavity defined in the main faucet body 12. In the embodiment of FIG. 2B, contact between the underside surface 48a of retaining flange 48 of adaptor sleeve 40 and the free edge surface 27b of the sidewall 27 of main faucet body 12 prevents any further axial movement of the adaptor sleeve 40 to compress the washer 30 against the base 26 of the cavity defined in the main faucet body 12. The retaining flange 48 of the adapter sleeve 40 and the sidewall 27 of the main faucet body 12 are desirably configured so that the flange 48 contacts the free edge surface 27b of the sidewall 27 before the star lock washer 30 is completely compressed between the seat portion 44 of the adapter sleeve 40 and the base 26 that defines the bottom of the cavity of the main faucet body 12.

In the alternative embodiment shown in FIG. 2C, the axial movement of the adaptor sleeve 40 that compresses the washer 30 against the base 26 of the cavity defined in the main faucet body 12 is limited by contact between the forward edge 45 of adaptor sleeve 40 and the ledge 32 of the interior surface of sidewall 27 of main faucet body 12. The retaining flange 48 of the adapter sleeve 40 and the ledge 32 of the interior surface of the sidewall 27 of the main faucet body 12 are desirably configured so that the flange 48 contacts the ledge 32 before the star lock washer 30 is completely compressed between the seat portion 44 of the adapter sleeve 40 and the base 26 that defines the bottom of the cavity of the main faucet body 12.

In operation, the main faucet body 12 would be installed and fixed to the wall or sink, as the case may be. The O-ring 50 is inserted into the groove 43 in the adapter sleeve 40. The second opening 64 of the retaining nut 60 is pushed over the end of the riser 20 with the threaded portion 33. The tapered threaded portion 33 of the riser 20 is screwed into the tapered threaded portion 49 inside the adapter sleeve 40. The star lock washer 30 is dropped into the cavity formed in the main faucet body 12 and rests on the base 26 of the main faucet body 12. The adapter sleeve 40 that is screwed onto the end of the riser 20 is axially inserted into the cavity of the main faucet body 12 so that the seat 44 rests against the star washer 30. The O-ring 50 formed by a deformable elastic material forms a water-tight seal between the exterior of adapter sleeve 40 and the interior surface of the sidewall 27 of the main faucet body 12. The first opening 63 of the retaining nut is aligned with the threaded outer surface 36 of the sidewall 27 of the main faucet body 12. As shown in FIG. 2A for example, the retaining nut 60 is then rotated and screwed onto the threaded outer portion 36 of the sidewall 27 of the main faucet body 12. Further rotation of retaining nut 60 causes the shoulder portion 68 of retaining nut 60 to contact the retaining flange 48 of adapter sleeve 40. Once such contact has been made, continued rotation of the retaining nut 60 causes axial movement of the adapter sleeve 40 toward the base 26. As shown in FIG. 2B for example, contact between the underside surface 48a of retaining flange 48 of adaptor sleeve 40 and the free edge surface 27b of the sidewall 27 of main faucet body 12 prevents any further axial movement of the adaptor sleeve 40 toward the base 26. The two arrows shown in FIG. 2C schematically illustrate the relative axial movement of the adapter sleeve 40 toward the base 26 of the main faucet body 12 and the resulting compression of the star lock washer 30.

The shoulder portion 68 of retaining nut 60 prevents axial movement of the adapter sleeve 40 and riser 20 in the direction opposite to the direction of the arrows shown in FIG. 2C. Loosening of the retaining nut 60 permits the operator to lift the adapter sleeve 40 and riser 20 so that the seat portion 44 of the adapter sleeve disengages from the star lock washer 30 and permits rotation of the adapter sleeve 40 relative to the sidewall 27 of the main faucet body 12. This relative rotation permits the operator to orient the position of the spray nozzle valve 22 relative to main faucet body 12. Once the desired orientation has been obtained, the operator can rotate the retaining nut 60 to produce axial movement in the direction indicated by the arrows in FIG. 2C and secure the adapter sleeve 40 against rotation relative to the sidewall 27 as the star lock washer 30 engages the base 26 of the main faucet body and engages the seat portion 44 of the adapter sleeve 40.

While at least one presently preferred embodiment of the invention has been described using specific terms, such description is for illustrative purposes only, and it is to be understood that changes and variations may be made without departing from the spirit or scope of the following claims.

What is claimed is:

1. A faucet assembly for regulating the flow of water from a pressurized water service, comprising:
    a main faucet body including an internal passage wall defining an internal passage that is configured to be connected in communication with a water service, said main faucet body including a base and a sidewall extending axially from said base to define a first opening opposite said base, said base defining a second opening opposite said first opening, said sidewall defining an axially extending interior surface, said base and said interior surface of said sidewall defining an axially extending cavity, said main faucet body being configured to provide fluid communication between said internal passage and said cavity through said second opening in said base, said sidewall of said main faucet body defining an exterior surface configured with a threaded portion;
    a resiliently compressible, positive locking mechanism disposed in said cavity and resting on said base of said cavity in said main faucet body;
    an axially extending adapter sleeve having a first end and a second end opposed to said first end, said first end of said adapter sleeve defining a seat portion disposed in said cavity and resting against said resiliently compressible, positive locking mechanism, said adapter sleeve having an axially extending wall defining an exterior and a hollow interior;
    a sealing member configured and disposed to form a water-tight seal between said adapter sleeve and said main faucet body;
    a riser defining an axially extending hollow rigid tube having opposed ends, one end of said tube being detachably connected to said adapter sleeve; and
    a retaining nut defining an axially extending hollow nut having a first end defining a first opening and a second end defining a second opening, said nut defining a shoulder portion extending radially and defining said second opening, said first opening being configured to allow passage of said sidewall of said main faucet body, said second opening being configured to allow passage of said riser, said nut being detachably connected to said sidewall of said main faucet body, and said shoulder portion of said retaining nut engaging said sidewall of said adapter sleeve to compress said resiliently compressible, positive locking mechanism between said seat portion of said adapter sleeve and said base of said main faucet body.

2. A faucet assembly as in claim 1, wherein said resiliently compressible, positive locking mechanism includes a star lock washer.

3. A faucet assembly as in claim 1, wherein said sidewall of said main faucet body defines a free edge surface;
said adaptor sleeve defining a retaining flange extending radially from the exterior of said axially extending wall near said second end of said adaptor sleeve; and
said retaining flange of said adapter sleeve and said free edge surface of said sidewall of said main faucet body are configured and disposed so as to limit the maximum compression of said resiliently compressible, positive locking mechanism between said seat portion of said adapter sleeve and said base of said main faucet body.

4. A faucet assembly as in claim 1, wherein:
said interior surface of said sidewall of said main faucet body defining a throat portion at one end and a mouth portion opposite to said throat portion, said interior surface of said sidewall defining a ledge disposed parallel to said base, said ledge defining one end connected to said throat portion and an opposite edge connected to said mouth portion; and
said exterior of said adapter sleeve being surrounded by a forward edge that is disposed near said seat portion, said forward edge being aligned generally with said ledge in said interior surface of said sidewall of said main faucet body while said seat portion rests against said resiliently compressible, positive locking mechanism.

5. A faucet assembly as in claim 4, wherein said forward edge of said adapter sleeve and said ledge of said interior surface of said sidewall of said main faucet body are configured and disposed so as to limit the maximum compression of said resiliently compressible, positive locking mechanism between said seat portion of said adapter sleeve and said base of said main faucet body.

6. A faucet assembly as in claim 1, wherein:
said adapter sleeve including a retaining flange projecting radially from said exterior of said adapter sleeve near said second end thereof; and
said shoulder portion of said retaining nut engaging said retaining flange of said exterior of said adapter sleeve.

7. A faucet assembly as in claim 1, wherein:
said adapter sleeve having a groove defined in the exterior of said adapter sleeve, said groove extending circumferentially around said exterior of said adapter sleeve and receiving said sealing member.

8. A faucet assembly as in claim 1, wherein said axially extending interior wall of said adapter sleeve includes a tapered threaded portion, said riser having a tapered threaded portion at one end of said riser, said tapered threaded portion of said riser being detachably connected to said tapered threaded portion of said interior wall of said adapter sleeve.

9. A faucet assembly as in claim 1, wherein said resiliently compressible, positive locking mechanism is sufficiently compressed between said seat portion of said adapter sleeve and said base of said main faucet body so as to prevent relative rotation between said adapter sleeve and said main faucet body.

10. A faucet assembly as in claim 1, further comprising:
a flexible hose having a pair of opposed ends, one end of said hose being connected to said opposite end of said riser; and
a spray nozzle valve having an inlet end connected to said opposite end of said hose.

11. A faucet assembly as in claim 10, further comprising:
a wall bracket having one end connected to said riser and an opposite end configured to be attached to a wall; and
a retention hook having one end connected to said riser and an opposite end configured to retain said spray nozzle valve.

12. A faucet assembly as in claim 1, wherein said sealing member includes an O-ring.

13. A faucet assembly for regulating the flow of water from a pressurized water service, comprising:
a main faucet body including a base and a sidewall extending axially from said base to define a first opening opposite said base, said sidewall defining an axially extending interior surface, said interior surface of said sidewall and said base defining an axially extending cavity, said base defining a second opening opposite said first opening, said interior surface of said sidewall defining a throat portion at one end and a mouth portion opposite to said throat portion, said interior surface of said sidewall defining a ledge disposed parallel to said base, said ledge defining one end connected to said throat portion and an opposite edge connected to said mouth portion, said main faucet body including an internal passage wall defining an internal passage, said main faucet body defining a conduit wall defining a conduit connecting said internal passage to said cavity via said second opening, said base being connected between said throat portion of said interior surface of said sidewall and said conduit wall, said sidewall of said main faucet body defining an exterior surface configured with a threaded portion;
a star lock washer disposed in said cavity and resting on said base of said cavity in said main faucet body;
an axially extending adapter sleeve disposed in said cavity and resting against said star lock washer, said adapter sleeve having an axially extending interior wall defining a hollow interior, said adapter sleeve having a first end and a second end opposed to said first end, said adapter sleeve having a groove defined in the exterior of said adapter sleeve near said first end, said groove extending circumferentially around said exterior of said adapter sleeve, said first end of said adapter sleeve defining a seat portion, said exterior of said adapter sleeve being surrounded by a forward edge that is disposed between said seat portion and said groove, said forward edge being aligned generally with said ledge in said interior surface of said sidewall of said main faucet body while said seat portion rests against said star lock washer, said adapter sleeve including a retaining flange projecting radially from said exterior of said adapter sleeve near said second end thereof, said interior wall of said adapter sleeve defining a tapered threaded portion between said second end and said seat portion;
an O-ring disposed in said groove in said exterior of said adapter sleeve and engaging said interior surface of said sidewall of said main faucet body;
a riser defining an axially extending hollow rigid tube having opposed ends, said tube defining an exterior surface, said exterior surface at one end of said tube defining a tapered threaded portion configured to mate with said tapered threaded portion of said adapter sleeve, said tapered threaded portion of said riser being screwed into said tapered threaded portion of said adapter sleeve; and
a retaining nut defining an axially extending hollow nut having a first end defining a first opening and a second end defining a second opening, said first opening being configured to allow passage of said sidewall of said main faucet body, said second opening being configured to allow passage of said riser, said nut defining adjacent said first opening an axially extending interior surface with a threaded portion defined thereon, said threaded portion being configured to mate with said threaded portion of said exterior surface of said sidewall of said main faucet body, said threaded portion of said exterior of said sidewall of said main faucet body being screwed into said threaded portion of said retaining nut, said nut defining a shoulder portion extending radially from said axially extending interior surface and defining said second opening, and said shoulder portion engaging said retaining flange of said sidewall of said adapter sleeve to compress said star washer between said seat portion of said adapter sleeve and said base of said main faucet body.

14. A faucet assembly as in claim 13, wherein:

said forward edge of said adapter sleeve and said ledge of said interior surface of said sidewall of said main faucet body are configured so that said forward edge of said adapter sleeve contacts said ledge of said interior surface of said sidewall of said main faucet body before said star lock washer is completely compressed between said seat portion of said adapter sleeve and said base of said main faucet body.

\* \* \* \* \*